United States Patent
Sample et al.

(10) Patent No.: US 10,353,526 B1
(45) Date of Patent: Jul. 16, 2019

(54) ROOM-SCALE INTERACTIVE AND CONTEXT-AWARE SENSING

(71) Applicant: DISNEY ENTERPRISES, INC., Burbank, CA (US)

(72) Inventors: Alanson Sample, Pittsburgh, PA (US); Chouchang Yang, Pittsburgh, PA (US); Yang Zhang, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 15/958,982

(22) Filed: Apr. 20, 2018

Related U.S. Application Data

(60) Provisional application No. 62/627,258, filed on Feb. 7, 2018.

(51) Int. Cl.
*G06F 3/044* (2006.01)
*G06F 3/01* (2006.01)
*C09D 5/24* (2006.01)
*H04W 4/80* (2018.01)
*H04W 4/33* (2018.01)

(52) U.S. Cl.
CPC ............ *G06F 3/044* (2013.01); *C09D 5/24* (2013.01); *G06F 3/011* (2013.01); *H04W 4/33* (2018.02); *H04W 4/80* (2018.02)

(58) Field of Classification Search
CPC .......... G06F 3/044; G06F 3/011; H04W 4/33; H04W 4/80; C09D 5/24
USPC .................................... 341/15; 345/173–175
See application file for complete search history.

(56) References Cited

U.S. PATENT DOCUMENTS

| | | | |
|---|---|---|---|
| 8,363,034 B2 * | 1/2013 | Tanimizu | G06F 3/0416 178/18.06 |
| 9,122,330 B2 * | 9/2015 | Bau | G06F 3/016 |
| 2012/0146944 A1 * | 6/2012 | Lee | G06F 3/0416 345/174 |

* cited by examiner

*Primary Examiner* — Khai M Nguyen
(74) *Attorney, Agent, or Firm* — Marsh Fischmann & Breyfogle LLP; Kent A. Lembke; Robert G. Crouch

(57) ABSTRACT

Human environments are typified by walls—homes, offices, schools, museums, hospitals and pretty much every indoor context one can imagine has walls. In many cases, they make up a majority of readily accessible indoor surface area, and yet they are static—their primary function is to be a wall, separating spaces and hiding infrastructure. We present the Wall++ system, a low-cost sensing approach that allows walls to become a smart infrastructure. Instead of merely separating spaces, walls can now enhance rooms with sensing and interactivity. Our wall treatment and sensing hardware can track users' touch and gestures, as well as estimate body pose if they are close. By capturing airborne electromagnetic noise, we can also detect what appliances are active and where they are located. Through a series of evaluations, we demonstrate the Wall++ system can enable robust room-scale interactive and context-aware applications.

23 Claims, 11 Drawing Sheets

ROOM-SCALE INTERACTIVE AND CONTEXT-AWARE SENSING

CROSS-REFERENCE TO RELATED APPLICATIONS

This application claims priority to U.S. Provisional Application No. 62/627,258, filed Feb. 7, 2018, the contents of which are incorporated herein by reference in its entirety.

BACKGROUND

Below we discuss three key areas of related work. First, we discuss prior work that enables room-scale touch tracking. We then review room-scale approaches for tracking user location and pose. We conclude with systems able to detect and track objects. In particular, we focus primarily on systems that are deployed in the environment, as opposed to those that are carried (e.g., smartphones, wearables).

Room-Scale Touch

Most previous systems have achieved wall-scale touch sensing through optical approaches. For example, LaserWall used a scanned laser rangefinder operating parallel to a wall's surface to detect hand touches. Infrared emitter-detector arrays have also been used to create large interactive surfaces. Most popular are camera-based approaches, including invisible light, depth, and even thermal imaging.

People have also explored acoustic touch sensing approaches, for example, by attaching microphones to the corners of a desired interactive surface and using time difference of arrival methods. It is also possible to use an array of centrally located acoustic sensors for estimating the location of tap events. Researchers have also forgone absolute spatial tracking, and instead built interactions around gesture vocabularies.

More relevant to the systems disclosed herein are systems that use capacitive sensing. Early work by Smith et al. demonstrated a capacitive sensing wall able to detect user gestures such as swipes, though users had to stand on an active transmitter electrode. Living Wall offered discrete touch patches as part of an art installation. Electrick used electrical field tomography for coarse touch tracking, including a demo on a 4×8 foot sheet of drywall. To enable fine-grained finger interactions on furniture, researchers have used dense, self-capacitive electrode matrices.

Also, SmartSkin demonstrated a table-sized (80×90 cm) mutual capacitive matrix for touch sensing. We move beyond this seminal work with novel hardware and tracking algorithms, as well as a deeper exploration of electrode/antenna fabrication, especially as it relates to walls. We also uniquely consider interaction modalities at room scale.

User Tracking and Pose Estimation

There is extensive literature on indoor user localization. Technical approaches that instrument the environment include computer vision, floor pressure sensing, floor and/or furniture capacitive sensing, and RF sensing. Conversely, users can be instrumented with tags, such as RFID and Bluetooth beacons. There has also been substantial work on human pose estimation. Most common is to use cameras looking out onto an environment. Alternatively, cameras have been installed below the floor, as seen in GravitySpace and MultiToe, which used a room-sized FTIR floor to track users and infer posture. Beyond cameras, RF-based approaches are also popular, including Doppler radar, RFID tracking, and co-opting WiFi signals.

Most relevant to our systems are capacitive sensing methods. One of the earliest examples leveraging this phenomenon is the Theremin, a gesture-controlled electronic musical instrument. In HCI, researchers have frequently explored using capacitive sensing to detect the type and magnitude of body motion. For example, Mirage attached electrodes to a laptop to detect dynamic poses such as arm lifting, rotating and jumping. Valtonen et al. used two electrodes attached to the floor and ceiling to sense a user's height and thus can classify postures such as sitting and standing. Finally, Grosse-Puppendahl et al. explored posture estimation by instrumenting furniture with multiple electrodes, for example, a couch that can detect discrete postures such as sitting and lying.

Object & Appliance Sensing

Many systems have demonstrated appliance and tool detection using cameras. For example, Snap-To-It used a smartphone's camera to recognize and use appliances (e.g., an office printer). Maekawa et al. utilized wrist-worn cameras to detect what object was currently being used. Finally, Zensors leveraged crowd workers and machine learning to answer user-defined questions about environments, including appliances.

Another common approach is to sense sound or vibration emitted from operating appliances or objects. ViBand leveraged micro-vibrations propagating through a user's body for detection. Viridi Scope implemented a sensor tag featuring a microphone that can infer power consumption of an appliance. Similarly, UpStream attached a microphone to faucets for water consumption monitoring.

It is also possible to tag or mark an object for detection. For example, QR codes can be captured by cameras for object recognition. In addition, capacitive near-field communication has been used to augment objects with antennas for communication. Finally, RFID tags and Bluetooth beacons (as well as most work previously reviewed on user tracking), can also be adopted for object and appliance sensing.

Finally and closest to our sensing principle are approaches that take advantage of EM noise generated by appliances when active. This has been sensed previously by coupling to power lines and users' bodies, or by placing sensors proximate (≤10 cm) to appliances. As we will discuss, our method makes use of airborne EM signals, which enables appliance detection and tracking. We also significantly extend the sensing range beyond previous work, from centimeters to room-scale.

It is against this background that the techniques described herein have been developed.

SUMMARY

Disclosed herein is a multimode sensing system installed on a wall of a building structure. The system includes an array of conductive electrodes installed on the wall, the array arranged into rows and columns of conductive electrodes; a plurality of conductive traces installed on the wall, each trace interconnecting each of the conductive electrodes in a given row or column; a transmitter electrically coupled to one of the rows or the columns of the array of conductive electrodes; a receiver electrically coupled to the other of the rows or the columns of the array of conductive electrodes; and a processor coupled to the transmitter and the receiver to perform mutual capacitive sensing to determine the position on the array where a change in capacitance is sensed, and coupled to the receiver to perform electromagnetic sensing to sense what types of electronic objects are proximate to the wall and to determine the position on the array where the electronic objects are sensed.

A room may be at least partially defined by at least two such walls with multimode sensing systems defined thereon. The array of conductive electrodes may be formed on the wall by applying a pattern of electrically-conductive paint thereon. The plurality of conductive traces may be formed on the wall by applying conductive tape thereon. The conductive electrodes may be diamond-shaped.

The mutual capacitive sensing may determine the body pose of a human in close proximity to or in contact with the wall, or may determine the body size of a human in close proximity to or in contact with the wall. A human in proximity to the wall may wear a cooperative electromagnetic transmitter that can be tracked by the system. The mutual capacitive sensing may determine a contact point of a human with the wall.

The transmitter and receiver may operate at RF frequencies.

Also disclosed is a sensing system that includes: a wall extending in a vertical plane, the wall being at least one meter wide and at least one meter tall; a patterned array of electrodes applied to the wall, the pattern extending at least one meter wide in a horizontal direction and the pattern extending at least one meter tall in a vertical direction; and a controller electrically connected to the patterned array of electrodes that utilizes passive electromagnetic sensing to sense electromagnetic energy from a source of electromagnetic energy, determine a location on the wall closest to the source of electromagnetic energy, and determine a type of electronic device that is the source of the electromagnetic energy.

The determination of the type of electronic device that is the source of electromagnetic energy may be made by comparing a frequency spectrum of the sensed electromagnetic energy to known frequency spectrums of electromagnetic energy from known electronic devices.

The patterned array of electrodes may be applied to the wall as paint. The paint may be electrically-conductive paint. The patterned array of electrodes applied by paint may be covered on the wall by another layer of paint that is not electrically-conductive.

The patterned array of electrodes may be arranged into a plurality of rows and a plurality of columns. Each of the electrodes in a given one of the plurality of rows may be electrically connected together and each of the electrodes in a given one of the plurality of columns may be electrically connected together.

Also disclosed is a sensing system that includes: a wall extending in a vertical plane, the wall being at least one meter wide and at least one meter tall; a patterned array of electrodes applied to the wall, the pattern extending at least one meter wide in a horizontal direction and the pattern extending at least one meter tall in a vertical direction; and a controller electrically connected to the patterned array of electrodes that utilizes mutual capacitive sensing to sense contact by a human with the wall and the location on the wall of the human contact and that utilizes passive electromagnetic sensing to sense electromagnetic energy from a source of electromagnetic energy, determine a location on the wall closest to the source of electromagnetic energy, and determine a type of electronic device that is the source of the electromagnetic energy.

The determination of the type of electronic device that is the source of electromagnetic energy may be made by comparing a frequency spectrum of the sensed electromagnetic energy to known frequency spectrums of electromagnetic energy from known electronic devices.

The patterned array of electrodes may be applied to the wall as paint. The paint may be electrically-conductive paint. The patterned array of electrodes applied by paint may be covered on the wall by another layer of paint that is not electrically-conductive.

The patterned array of electrodes may be arranged into a plurality of rows and a plurality of columns. Each of the electrodes in a given one of the plurality of rows may be electrically connected together and each of the electrodes in a given one of the plurality of columns may be electrically connected together.

Also disclosed in a sensing system that includes: a wall extending in a vertical plane, the wall being at least one meter wide and at least one meter tall; a patterned array of electrodes applied to the wall, the pattern extending at least one meter wide in a horizontal direction and the pattern extending at least one meter tall in a vertical direction; and a controller electrically connected to the patterned array of electrodes that senses which of the electrodes is closest to a source of electromagnetic energy.

The patterned array of electrodes may be applied to the wall as paint. The paint may be electrically-conductive paint. The patterned array of electrodes applied by paint may be covered on the wall by another layer of paint that is not electrically-conductive. The patterned array of electrodes may be arranged into a plurality of rows and a plurality of columns. Each of the electrodes in a given one of the plurality of rows may be electrically connected together and each of the electrodes in a given one of the plurality of columns may be electrically connected together.

DETAILED DESCRIPTION

Figure 1:
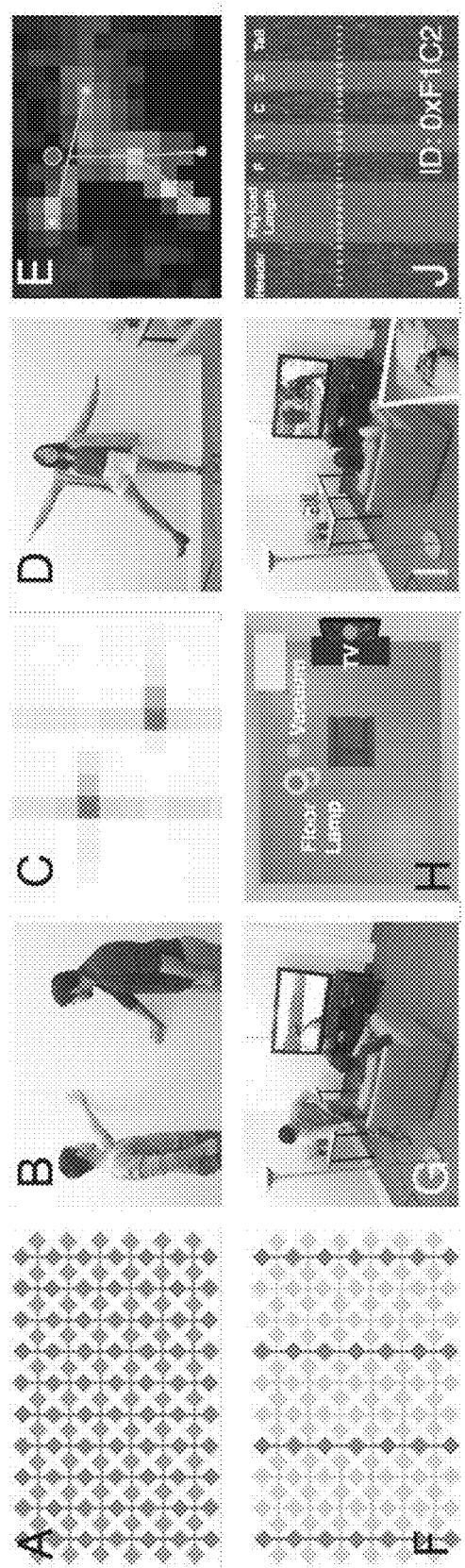
FIG. 1 shows the Wall++ system in active mutual capacitive sensing mode (A), which enables touch tracking (B,C) and pose estimation (D,E). It also shows the Wall++ system in passive airborne electromagnetic sensing mode (F), which enables appliance detection and tracking (G,H), as well as user ID (I,J).

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Walls are everywhere, often making up more than half of indoor surface area, especially in residential and office buildings. In addition to delimiting spaces, both for functional and social purposes, they also hide infrastructure, such as wiring and HVAC. However, they are generally inactive structural elements, offering no inherent interactive or computational abilities (other than at small attached silos, e.g., thermostats and light switches), and thus present a tempting opportunity for augmentation, especially considering their ubiquity.

Herein, we identify methods that could recast walls as smart infrastructure, able to sense interactions and activities happening in a room. In addition to supporting these broad application domains, we also added process constraints. In particular, we sought a technical approach that was versatile and easy to apply, requiring no special tools (e.g., CNC machines) or skills (e.g., carpentry, electrical engineering). We also required our approach to be low-cost, so as to be economically feasible at room scale (even a small room, e.g., 2×2.5×2.5 m, has more than 20 m² of walls). Finally, we wanted our sensing approach to be minimally obtrusive, and ideally invisible.

We identified paint as a particularly attractive approach. Walls are already typically painted, and the average homeowner has the requisite skills to paint a wall. While there are special tools for applying paint (e.g., brushes, rollers, painter's tape), these are all commodity supplies and readily available at home improvement stores. As we will discuss in greater depth later, we can apply a standard latex topcoat, which allows our technique to be wall-scale, and yet hidden in plain sight. Our ultimately selected method costs ~$20 per m² in materials at retail prices. These properties satisfied all our process criteria.

To enable user and environmental sensing, we drew upon two large bodies of work in the literature. First, we selected mutual capacitive sensing for close-range interactions. Owing to its widespread use in smartphones and tablets, mutual capacitive sensing is well understood and robust, allowing us to readily adapt it to wall-scale applications. Second, we extended work in airborne electromagnetic (EM) sensing. This required us to develop an electrode pattern that supports both of these sensing modalities (FIGS. 1, A & F). For user sensing, we investigated touch interaction (FIGS. 1, B & C), pose estimation (D & E), user identification and tracking (I & J). For environment sensing, we focused on context awareness through appliance recognition and localization (G & H).

Collectively, we call our process, materials, patterns, sensor hardware and processing pipeline, the Wall++ system. As we detail in the following pages, optimizing for ease-of-application and reliability, as well as sensing range and resolution, required iterative experimentation, physical prototyping, simulation modeling and user studies. We believe our resulting system demonstrates new and interesting HCI capabilities and presents a viable path towards smarter indoor environments.

Electrode/Antenna Implementation

The basic principle of the Wall++ system sensing relies on patterning large electrodes onto a wall using conductive paint. Thus, as a first step, it was necessary to develop a reliable and economically-feasible way to add large electrodes to walls. To identify suitable materials and processes, we performed a series of tests with various conductive paints, backing materials, application methods, number of coats, and topcoats. We then explored different electrode patterns suitable for our applications, and optimized them for sensing range and resolution. In all tests, we used an LCR meter to measure electrical impedance at 100 kHz.

Both capacitive sensing and airborne EM sensing require conductive electrodes in order to induce charges freely. Thus, we identified paints that were inexpensive, non-toxic, and sufficiently conductive to support our application goals. We experimented with commercially-available carbon, water-based nickel, acrylic-based nickel, and silver paints. Simultaneously, we tested three common backing materials: wallpaper, drywall, and primed drywall. All paints were applied in a single coat with a roller.

Figure 2:
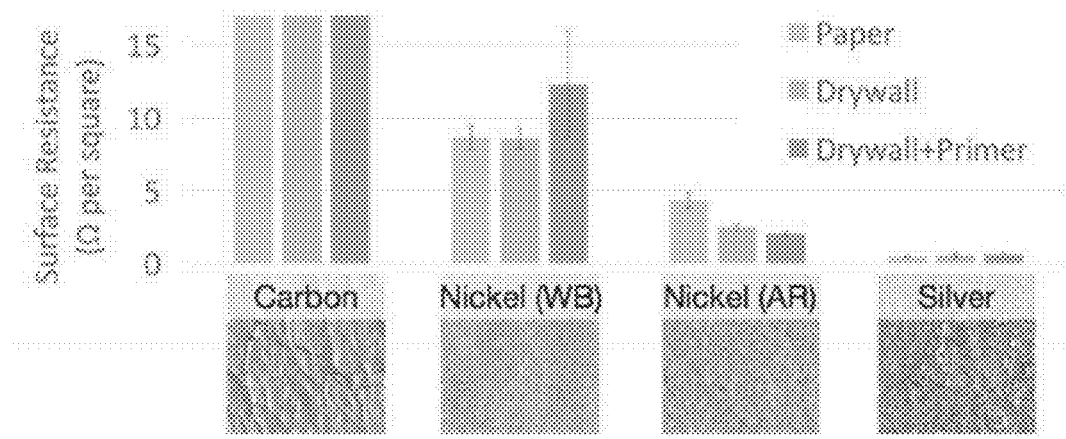
FIG. 2 illustrates conductivity tests with different paints across three backing materials, and including a close-up of the painted surface.

FIG. 2 shows the result of this 4×3 experiment. Despite its high conductivity, silver paint has high cost (~$200 per m²). Carbon paint has high electrical resistance, which is less than optimal with our technique. Among the two nickel-based paints, we favored the water-based version, as it produced less odor and resulted in a smoother finish (FIG. 2, bottom photos).

Figure 3:
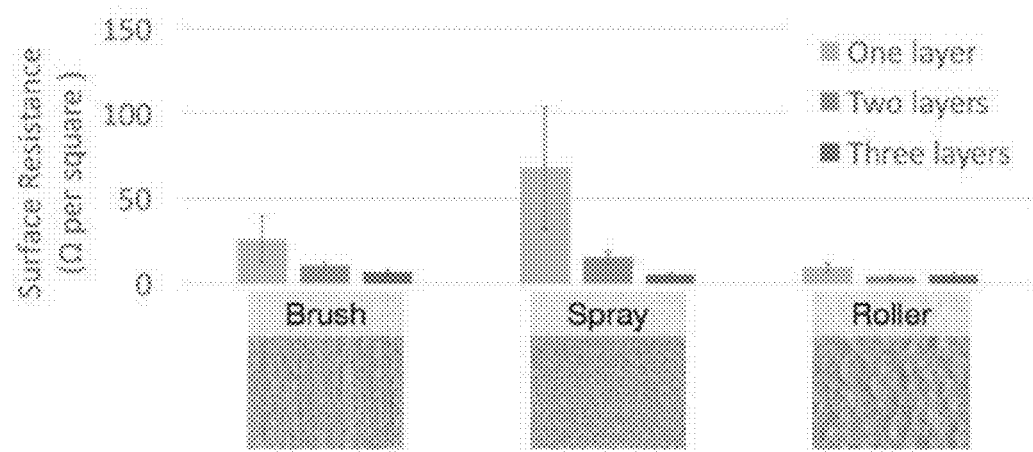
FIG. 3 illustrates conductivity tests with different application methods and number of coats.

With a conductive paint selected, we next considered its application method. We varied both the number of coats and the tool used, both of which affect conductivity. We tested brush, spray, and roller applications with one, two, and three coats, resulting in a 3×3 test. FIG. 3 shows these results, which consistently indicate that the surface conductivity increases with number of painted coats. Among the application methods, we favor roller painting, as it resulted in the highest conductivity and lower variance across the surface. As an added benefit, it was also the fastest application method.

To improve appearance and durability, we studied the effect of topcoats on our electrodes' performance. We suspected that solvents from later paint coats could interact with the conductive paint layer, affecting its conductivity. We also wanted to see if varying surface permittivity of different topcoat materials affected performance. For this experiment, we tested no topcoat, acrylic, primer, latex paint and wallpaper. However, we did not find any significant differences across these conditions, and thus we favor covering the Wall++ system in a standard architectural latex paint for improved durability, ease of cleaning and appearance.

To connect the painted electrodes, we run thin conductive traces between them. The transmitter electrodes need to be insulated from the receiver electrodes to project most of the electric field into the air, requiring insulation between trace intersections. Thus, as a precursor to exploring electrode pattern, we identified a trace option with high conductivity and good insulation. We looked at three materials: copper tape (3.2 mm width), silver ink drawn by pen (1 mm width), and nickel paint applied with stencil and brush (1 mm width). Simultaneously, we tested three insulation materials: vinyl sticker, latex paint and primer.

Conductivity testing showed that copper tape had the highest conductivity (0.13 Ω/cm, SD (standard deviation)= 0.0), followed by nickel paint (5.6 Ω/cm, SD=4.9) and silver traces (63.5 Ω/cm, SD=10.4). In the insulation test, we found that nickel traces interacted with the latex paint and primer conditions, causing shorts, though it worked fine with vinyl stickers. Silver traces worked with all insulators, but had high variance in conductivity. Copper had the worst insulation due to a larger overlapping area, but the least variance, and for this reason, we used it in combination with vinyl stickers (the most consistent of the insulators we tested).

Having identified a reliable way to paint, connect and insulate conductive electrodes on walls, we selected a pattern that enabled our desired applications. Fortunately, airborne EM sensing is not particularly sensitive to pattern geometry, and SNR is mostly a function of antenna size. For example, previous work used copper patches or a simple wire antenna. Therefore, we chiefly optimized our design for mutual capacitive sensing, in which pattern plays a critical role. However, we confirmed the performance of our antenna designs in capturing airborne EM signals.

For mutual capacitance sensing, we desired a pattern that 1) projected an electric field as far as possible, so as to provide the largest interactive volume, while also 2) offering sufficient resolution to enable fine-grained interactions, such as touch tracking. We studied five patterns common in the literature: lines, stripes, half circle, diamond and circle dot (FIG. 4, top).

To best evaluate the electric field projection across these designs, we ran simulations using COMSOL. This provided a high-resolution view impossible to capture with hand measurements. We fixed the transmitter and receiver electrode size to 25 $cm^2$, except in our lines condition, which are purposely thin. We also fixed the distance between electrodes (i.e., pitch) to 5 cm, except in our lines and stripes conditions. We set the voltage difference between transmitters and receivers at 18 V.

Figure 4:
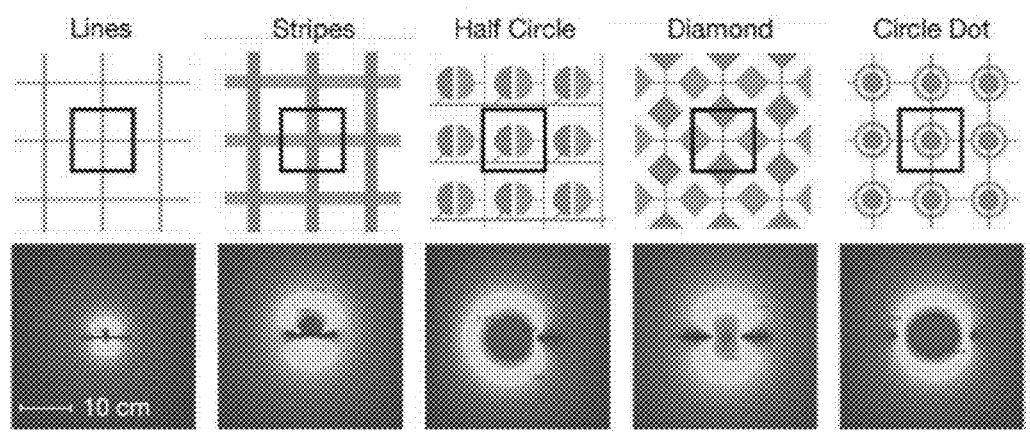
FIG. 4 in the top view shows electrode patterns that were studied (transmitters in red/darker shade, receivers in blue/lighter shade). The bottom view shows electric field simulations of electrodes in black region (higher voltages in red/center regions).

FIG. 4, bottom, shows our simulation results. Due to the short-range of its electric field projection, we did not favor lines as a candidate design. Projection range is improved with the increased electrode size in stripes, however there is too much inner capacitance between electrodes, which significantly reduces SNR and sensing range. The rest of the patterns do not suffer from this issue and have similar projection range. Ultimately, we used the diamond pattern because it densely covers the surface, making it unlikely to miss user touches.

After selecting the diamond pattern, there were two immediate parameters to tune—the size of the diamonds and the pitch. Intuitively, bigger diamonds and pitches should project larger electric fields. However, they also decrease the array's resolution. Therefore, we found parameters that offered a balance between sensing range and resolution.

Figure 5:
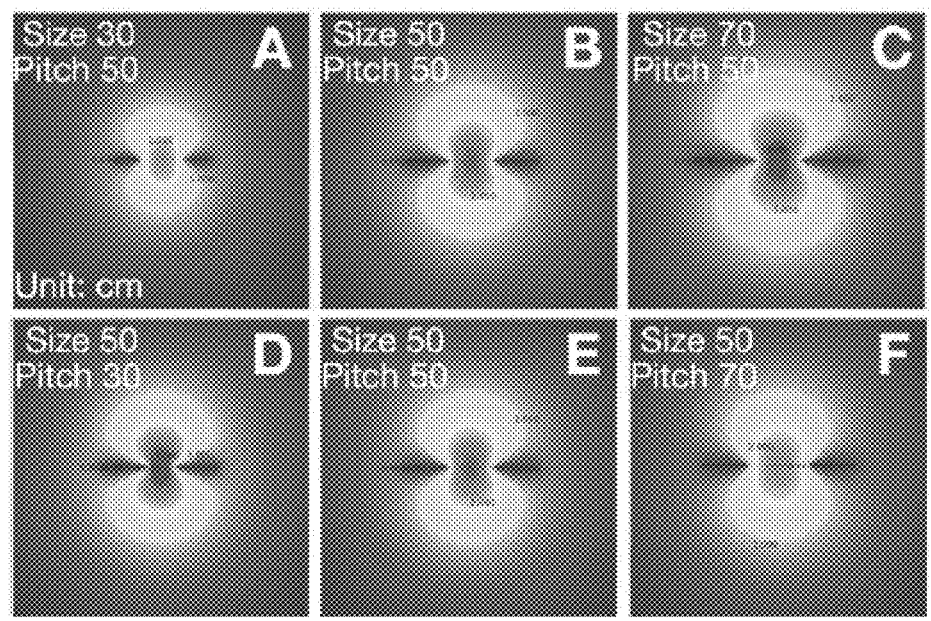
FIG. 5 shows simulations of diamond patterns with different sizes (A-C) and pitches (D-F).
Figure 6:
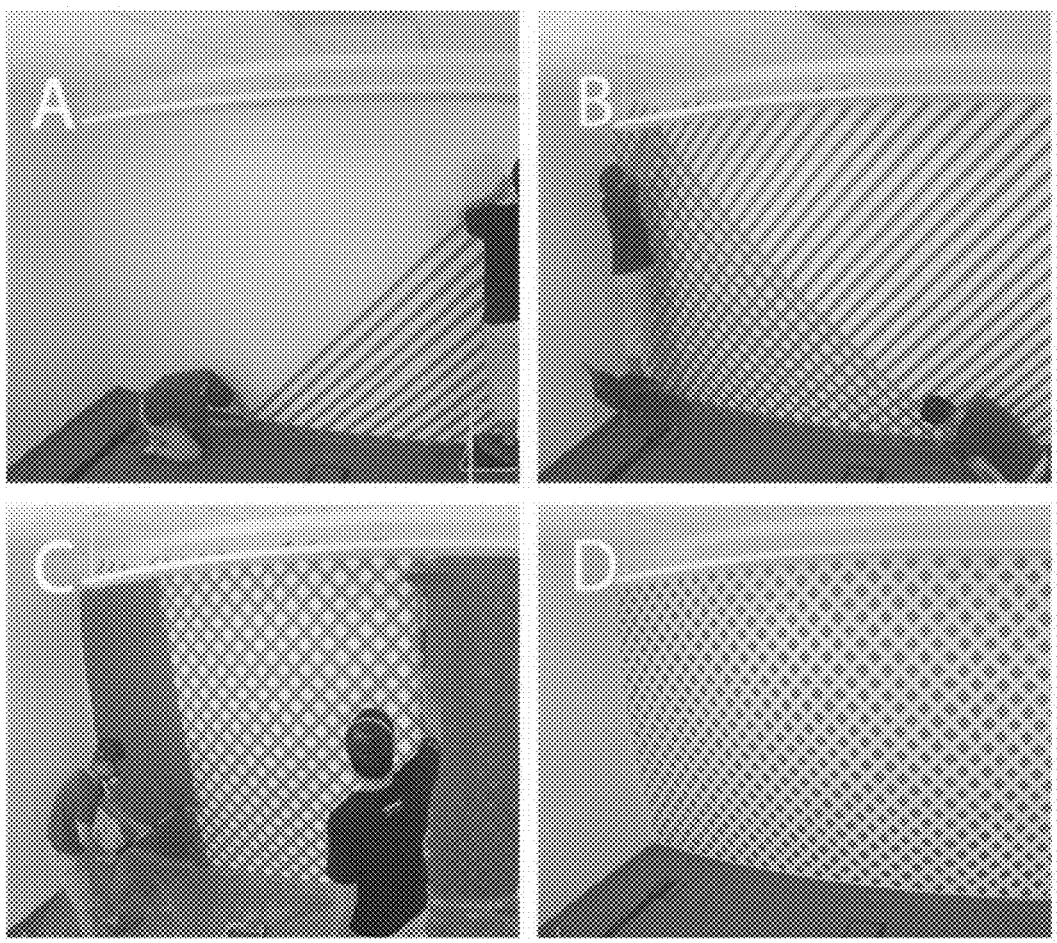
FIG. 6 shows painters tape laid down in a crosshatched pattern (A&B), and then painted en masse with a roller (C) to create a grid of regular diamonds (D).

FIG. 5, A-C, show electric field simulations at different electrode sizes (30, 50 and 70 cm) with a fixed 50 cm pitch. As expected, the bigger the electrode size, the farther the sensing range. FIG. 5, D-F, show simulations at different pitches (30, 50 and 70 cm) with an electrode size fixed at 50 cm. Interestingly, bigger pitches do not improve sensing range. Combining what we discovered in this experiment, we settled on 70 cm electrodes with a 48 cm pitch—a common width of painter's tape, facilitating fabrication. As seen in FIG. 6, a regular diamond pattern can be efficiently produced by laying down a crosshatch of painter's tape, and then using a paint roller.

Phase 7: Antenna Sensitivity

Phases 5 and 6 were primarily focused on mutual capacitance sensing. In this design phase, we wished to verify that our selected diamond pattern could robustly capture airborne EM signals. There are many ways to configure diamond patterns into an antenna array. For example, we could connect all columns and rows together to make one large antenna. However, this monolithic antenna eliminates the possibility of triangulating signal sources, discussed later.

Therefore, we investigated the idea of selecting a subset of diamond columns as antennas (as illustrated in FIG. 1F). These need not be single columns, but could be several adjacent columns connected together. To see if this improved signal, we conducted a test in a shielded chamber with minimal EM noise. To be able to vary antenna size, we painted diamond electrode patterns on individual 1×8' foam boards, each of which acted as a single-column antenna, but which could be connected together to make a multi-column antenna. We varied the number of columns in the antenna unit from 1 to 3, with a known signal source placed 50 cm away.

Results indicated that larger antenna sizes offered improved signal strength. However, the improvement was minor—a three-columned-antenna only improved signal strength by 15% over a single column unit. Given that the gain was modest, we decided to use single column antennas for circuit simplicity and improved spatial resolution.

Figure 7:
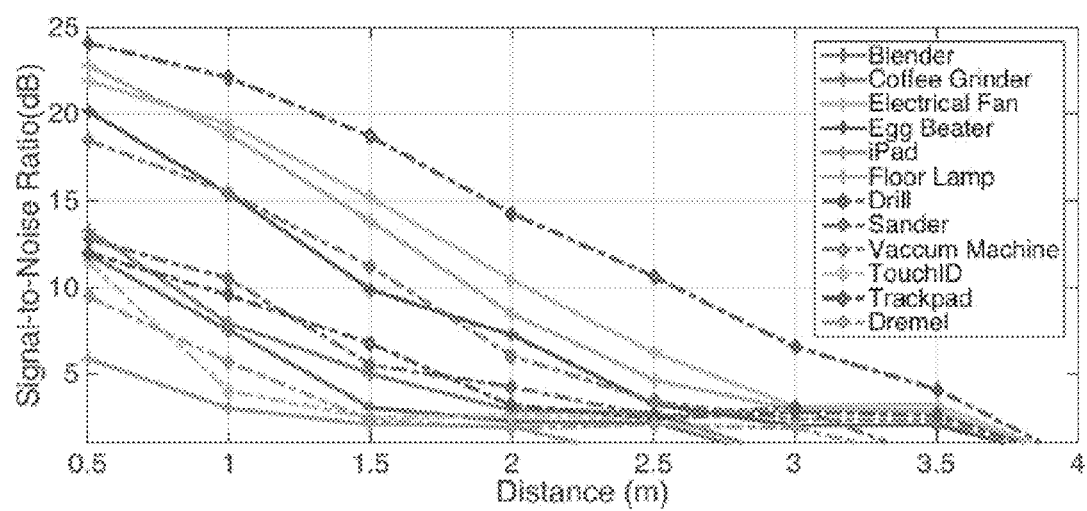
FIG. 7 shows received signal strength collected with different appliances operating at different distances to the wall antenna.

Next, to better quantify the sensitivity of single-column antennas, we collected EM signals from 12 appliances at varying distances. As can be seen in FIG. 7, all of our test appliances can be sensed within a 2-meter range, and some noisy devices up to 4 meters. We also found serendipitously that the human body broadcasts EM signals when holding and operating some appliances. For example, a hairdryer we tested had no visible signal unless a user was grasping it. We also found a class of appliances that only activate when touched (chiefly for power conservation), e.g., laptop trackpads and smartphone fingerprint readers. However, this has the interesting potential to allow for recognition of human activities at the moment of user engagement.

Phase 8: Wall Construction

After we finalized our fabrication parameters, we painted a real wall at our institution, measuring 12×8 foot (3.7×2.4 m), seen in FIGS. 1 (B & D) and FIG. 6. We used this wall to verify our previous focused experiments. This wall has 22 columns and 15 rows of electrodes, for a total of 37 coaxial cable connections to our custom sensing hardware. After we nickel painted the wall with a diamond pattern, we finished it with a standard latex paint. In total, the wall took roughly four hours to complete with a total material cost under $200. We anticipate that the time and material cost of a commercially-deployed solution would be significantly reduced with trained painters and bulk material purchase.

Sensing Hardware Implementation

Figure 8:
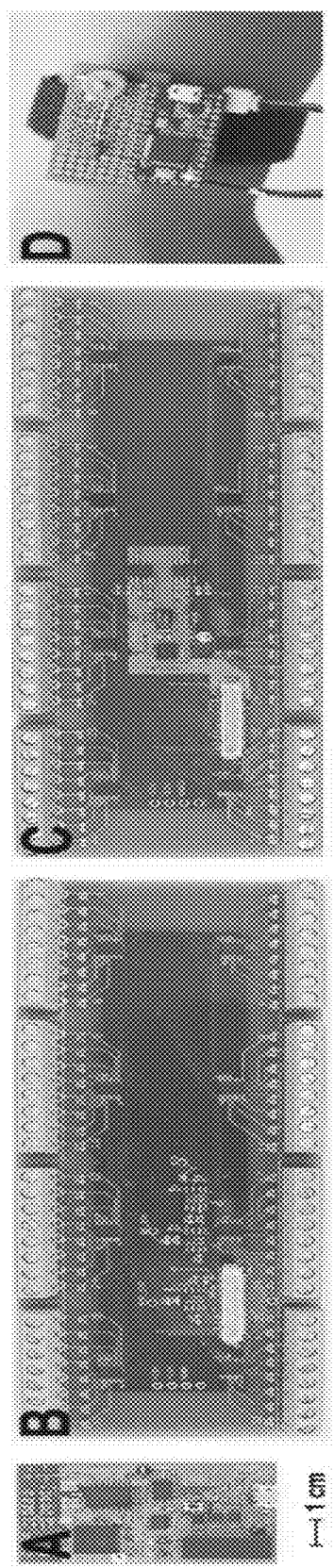
FIG. 8 shows different hardware components that were developed including A) Main sensor board, B) capacitive sensing multiplexing board, C) EM multiplexing board, and D) signal-emitting wristband, all with a uniform scale.

To enable user and environment sensing, the Wall++ system employs two distinct sensing modes: mutual capacitive sensing and airborne EM sensing. This required development of custom sensor boards (FIG. 8), built around a Cortex M4 microcontroller running at 96 MHz (MK20DX256VLH7), powered by Teensy 3.2 firmware. Our main board (FIG. 8A) plugs into two multiplexing boards, one designed for mutual capacitance sensing (FIG. 8B) and another for EM sensing (FIG. 8C). In the future, these could be integrated into a compact, single-board design.

Mutual Capacitance Sensing

To detect a user's hands and body pose, we use mutual capacitance sensing, which measures the capacitance between two electrodes. This sensing technique is the basis of modern touchscreens as seen in smartphones and tablets. When a body part is near a transmitter-receiver pair, it interferes with the projected electric field, reducing the received current, which can be measured. This is referred to as shunting mode sensing. On the other hand, if the user's body directly touches an electrode, it greatly increases the capacitance and received current.

In capacitive sensing mode, our main board uses an AD5930 [3] DDS to generate a 100 kHz sine wave as the excitation signal. This signal is amplified to 18 V peak-to-peak by the multiplexing board (FIG. 8B) and routed to a specified transmitter electrode column (FIG. 1A, red). We use another set of multiplexers to connect a receiver electrode row (FIG. 1A, blue) to our analog frontend, which is filtered and amplified. We use an AD637 RMS-DC converter to measure the amplitude of the received signal, which correlates to the capacitance between the current transmitter and receiver electrodes. We set the integration time for the AD637 to 100 microseconds (i.e., 10 periods of the excitation signal). The output of the converter is sampled by our microcontroller's built-in ADC.

Our 12×8 foot augmented wall has 22 columns and 15 rows. At any moment, only one transmitting column and one receiving row are selected for mutual capacitance sensing. The circuit measures the mutual capacitance between the two electrodes, which is most strongly affected by a user's body being proximate to (or touching) the intersection of the column and row. The circuit then moves on to the next row-column pair until all (22×15=) 330 measurements are collected. Thaese measurements are then sent to a laptop over USB at 16.5 FPS.

Airborne EM Sensing

In EM sensing mode, no active signals are injected into the wall's electrodes. The multiplexing board (FIG. 8C) features a differential amplification circuit with a 159 Hz high pass filter to remove DC components and powerline noise. One terminal of the input is connected to common ground, while the other terminal is cycled through columns, one at a time, each serving as a signal-column antenna. The signal is then amplified with a gain value of 100 and DC biased to AVDD/2 (1.65V) before sampling.

Our microcontroller's two built-in ADCs are configured into a high-speed, interleaved DMA mode, enabling a sampling rate of 4 MHz with 12-bit resolution. We collect 1024 ADC measurements and perform an on-board FFT computation. To better capture transient EM spikes, the board performs this measurement 20 times, and records the maximum value for each FFT bin as the result. This process takes ~20 milliseconds per column, resulting in an FPS of 6.2 for an 8-column-antenna setup.

Touch Sensing

Mutual capacitive sensing enables the Wall++ system to track a user's hand hovering above or touching a wall's surface. We first describe our software implementation, followed by our evaluation procedure and results.

Software

Due to fabrication inconsistencies, the raw capacitance measured at each row-column pair can vary. To compensate for this, we capture a background profile and convert all measurements into z-scores. When a user touches the wall, a transmitter and receiver pair are capacitively shorted, which makes the touched region have a significantly higher capacitance than the captured background. We can visualize this as a pixel in a capacitive image (FIG. 1C), which is thresholded to get touch coordinates. When a user's hand is hovering above a wall, it capacitively couples too many row-column pairs, appearing as a negative blob in the capacitive image. For hover tracking, we identify blobs of activated pixels, and interpolate the peak by calculating the center of mass in a 3×3 pixel area.

Evaluation

To investigate the hand tracking performance of the Wall++ system, we recruited 14 participants (7 female, average age of 24). The heights of these participants ranged from 160 to 183 cm, with masses ranging from 50 to 90 kg. The study took roughly 40 minutes to complete and participants were compensated $20 for their time. We used our 12×8' wall as the test apparatus. A calibrated projector was used to render experimental prompts for participants. Additionally, a small plastic-runged ladder was provided if requested points were beyond a participant's reach (which also provided a more challenging grounding condition to study).

We first asked participants to walk around for 10 minutes roughly one meter away from the wall. This provided 9900 no user present trials per participant. We then asked participants to "click" points digitally projected onto the wall's surface. When a point turned red, participants placed their hand to that point, allowing for 30 touch coordinates to be recorded over a 2 second period. The point then turned green, at which point participants held their hands roughly 10 cm from the point; 30 hover coordinates were recorded. No feedback about the tracking result was shown to participants. In total, 50 fully randomized points were requested from each of our 14 participants, resulting in 21,000 touch and 21,000 hover trials.

Results

Of the 138,600 no user present data points, representing 140 minutes of data, there were no touch or hover events reported by our system (i.e., 100% accuracy). Of our 21,000 touch trials, 97.7% (SD=2.4) were correctly labeled as touch events by our system (2.3% were incorrectly detected as hovers). Hover detection was 99.8% (SD=0.3) accurate.

Figure 9:
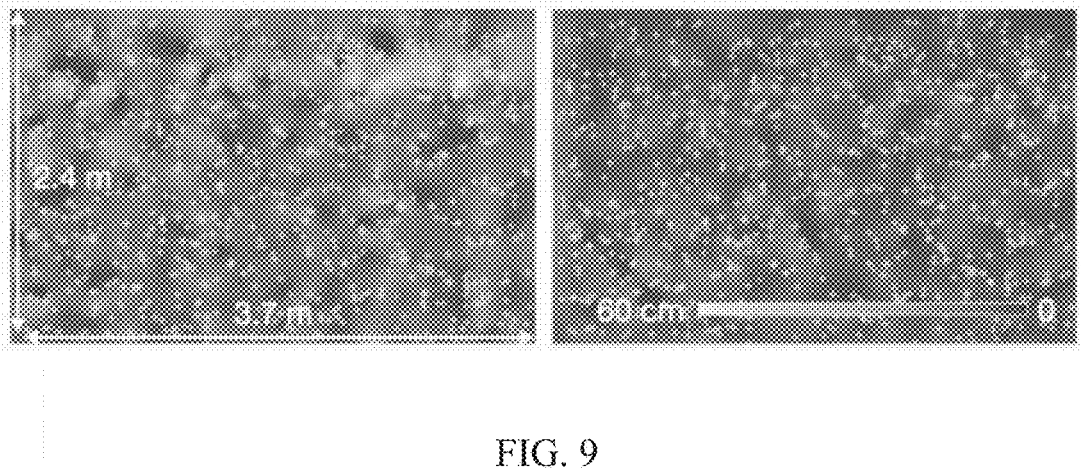
FIG. 9 shows touch (left) and hover (right) tracking distance error on our test wall (interpolated across surface). Green crosshairs show (50×14) 700 requested locations.

Using requested coordinates and our system's reported coordinates, we calculated the Euclidian distance error for our touch and hover trials. We found a mean touch tracking distance error of 13.7 cm (SD=1.1) and a mean hover tracking distance error of 6.5 cm (SD=0.3). FIG. 9 provides an interpolated error heat map across our wall's surface. There is one region of reduced accuracy, which we suspect is due to either a fabrication defect or possibly metal/electrical infrastructure behind the wall. Also, we did not see any reduction in accuracy for participants who used the ladder for reaching high points.

Pose Estimation

The Wall++ system can also estimate body pose of users if they are close to a wall. We now describe this software implementation, evaluation procedure and study results.

Software

Figure 10:
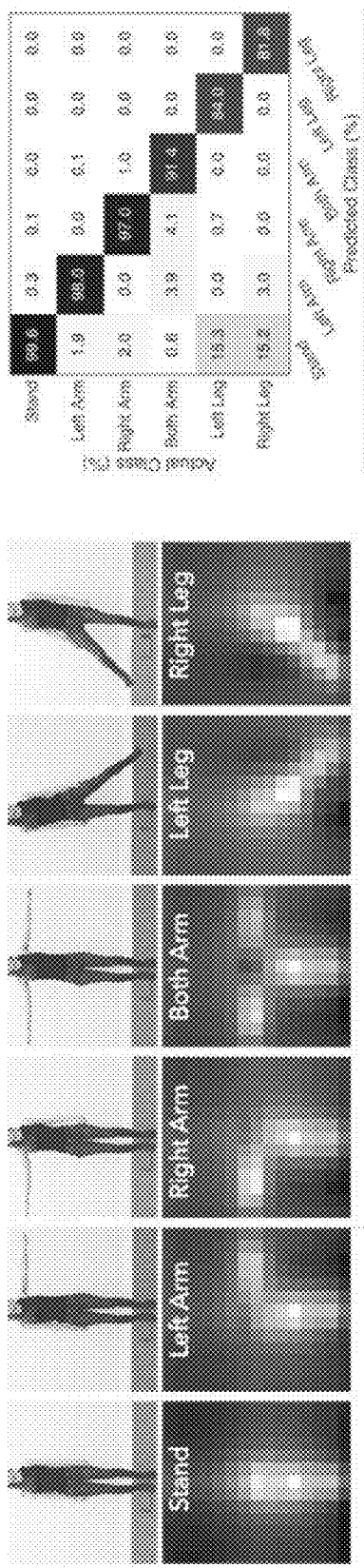
FIG. 10 shows on the left: six poses (top) and averaged capacitive images from the user study (bottom) and on the right: confusion matrix for 6 poses.

As with touch and hover tracking, pose estimation uses a z-scored capacitive image as input. We first look for users by sliding a 3×15 window along the x-axis, searching for a blob of sufficient total activation. If a region is found to be above threshold, pose estimation is triggered for that bounding box. Along the center column, pixels above a second threshold are labeled as the torso. We then scan to the left and right of the blob, labeling bottom extents as feet and upper extents as hands. An example of these five key points is shown in FIGS. 1, D and E. We can use these key points to characterize different body poses; for evaluation, we included standing, left arm lifted, right arm lifted, both arms lifted, left leg lifted, and right leg lifted (FIG. 10).

Evaluation

We used the same group of participants and apparatus as our touch tracking study. In total, there were five rounds of live testing. At the beginning of each round, we assigned participants to a random standing location 20 cm in front of the wall. They were then asked to perform the six test poses, sequentially, and in a random order. For each pose, we recorded 30 data points over a 2 second period, which resulted in 12,600 pose trials (5 rounds×6 poses×30 trials× 14 participants).

Results

Of the 12,600 trials we captured, 99.8% (SD=0.6) triggered our pose estimation pipeline. Overall, the system inferred the correct pose in 92.0% (SD=3.5) of trials; a confusion matrix is provided in FIG. 10. The greatest source of error (63.5%) is from left leg and right leg being confused with stand. FIG. 10, bottom-left, shows the averaged capacitive image for each pose (all trials and participants combined). We also found the torso key point accurately reflected a user's location along the wall, with a mean distance error of 8.6 cm (SD=2.2).

Appliance Detection

The Wall++ system captures airborne EM signals emitted by electrical appliances when running. In this section, we focus on detecting the on/off state of appliances (i.e., detection, but not localization). In being a room-scale sensing technique, The Wall++ system had to solve two important challenges, which differentiates us from prior work. First, unlike EM sensing with conductive media (e.g., powerlines, human bodies), air substantially attenuates EM signals, which would generally preclude long-range airborne EM sensing. We overcome this by using large antennas. Second, unlike worn EM detectors, which can generally assume that only one appliance is grasped at any given time, the Wall++ system should be able to handle simultaneous active appliances. For this, we use a special pipeline, described next.

Software

To help suppress persistently noisy EM bands (from e.g., fluorescent light ballasts), our system computes and uses z-scored FFTs. Before appliances can be recognized, they should be registered in our system. This is done by capturing data while an appliance is active, and recording its FFT signature. We then threshold this FFT to create a bit-mask representing characteristic frequencies for that appliance.

When live data is being streamed from our sensor board, the incoming FFTs are bit-masked against each known appliance and passed to a corresponding, appliance-specific SMO classifier (Poly Kernel, E=1.0; Output: running or not running). In essence, this bit-masking approach has the effect of making each appliance classifier blind to non-relevant EM bands, which enables multi-appliance detection, reduces training data collection, and improves overall robustness. We used a one-second classification hysteresis to reduce spurious appliance detections. The result of this process is a list of active appliances detected at each antenna. These sets are unioned to provide a list of active appliances in the room.

Evaluation

Figure 11:
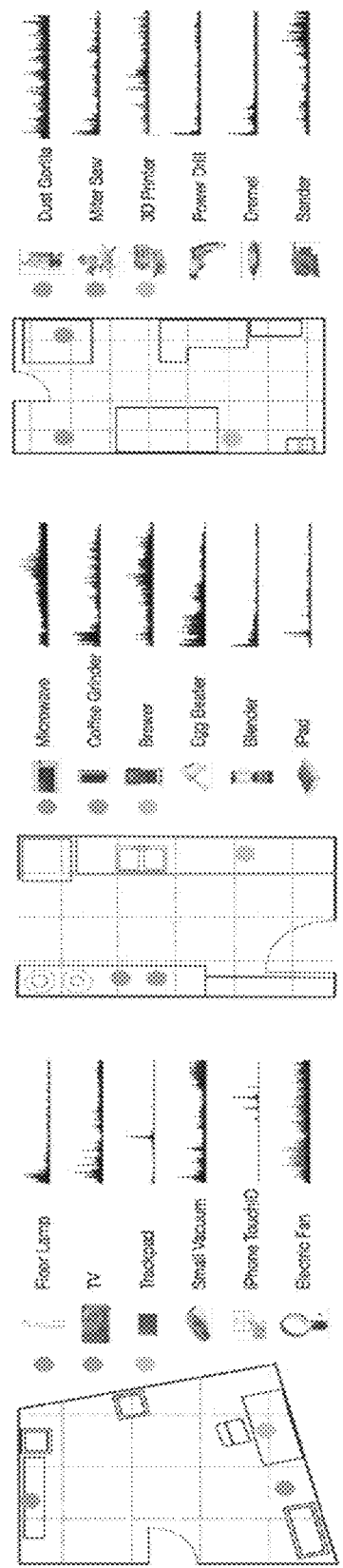
FIG. 11 shows on the left: floor plans of an office (left), kitchen (center), and workshop (right) and on the right: appliances and their EM profiles (0 to 2 MHz). One-meter-spaced grids are shown in dashed lines.

Room-scale appliance detection requires all walls to be augmented. However, our previous test apparatus was only a single wall (12×8 foot). To simulate a fully augmented room, we distributed 1×8 foot column antennas we had previously made for our Antenna Sensitivity study. As an added benefit, this apparatus allowed us to run our experiment in three different locations: office, kitchen, and workshop (FIG. 11). At each location, we evenly distributed eight column antennas around the room periphery, working around windows and doorways as needed.

In each location, we tested six contextually-appropriate appliances: three fixed and three mobile. The locations of fixed appliances are color coded in FIG. 11, while we randomized the position of mobile appliances according to a one-meter grid we laid out in each room. We omitted locations blocked by furniture, resulting in 12 test points in the Office, 14 in the Kitchen, and 26 in the Workshop.

To train our system for a room and its appliances, we collected EM signals using one antenna. In total, there were three rounds of training data collection. In each round, 90 data points were recorded over 15 seconds when no appliance was active. We then collected 90 data points for each appliance while active (one at a time), during which we varied the distance between the appliance and the antenna up to 2 meters. We then trained a classifier for each appliance, using the background data (i.e., no appliance running) and the other five appliances as negative examples.

At each location, we performed three rounds of live testing at different times of day—morning (~8 am), noon (~12 pm), and late night (~11 pm)—when the building had different environmental conditions, occupancy load, etc. In each round of testing, we first recorded 10 minutes of data (3720 data points) when no appliances were active, to test for false positives resulting from background EM noise. We then activated all six appliances, one at a time, in a random order. As an added experiment, we also turned on all three fixed appliances simultaneously. In all trials, we turned on and off the appliances five times each. Real-time detection results were recorded.

Results

Across the 90 minutes (33,480 data points) of data collected when no appliance was turned on, 1.3% (SD=1.0) of trials were labelled as having an appliance running (i.e., false positives). Across all trials when appliances were running, 85.3% (SD=4.9) correctly classified the active appliances. We found that mobile appliances contributed 88.4% (SD=12.8) of the errors, mostly when they were at the center of rooms and far from any antenna.

We found no significant difference in accuracy across time of day. However, we did found that background noise changed over time, and thus we had to recapture the background profile for our z-score computation at the start of each session. This indicates that the Wall++ system will need a dynamic backgrounding scheme when deployed.

Appliance Localization

Airborne EM signals attenuate as they radiate in air, leading to different signal amplitudes across a distributed array of antennas, such as column antennas along the walls of a room. The Wall++ system leverages this affect to localize the source of EM signals, and even track the source if mobile. In this section, we describe our tracking pipeline, and its evaluation and results.

Software

Our tracking pipeline extends our Appliance Detection pipeline by additionally using the masked FFTs to calculate a received signal strength (RSS) as P''' in (1) for each known appliance at each antenna. According to the Friis transmission formula [17], the relation between the appliance's location and its RSS measured at the i-th antenna can be modelled as $$f_i(x, y, A_T): \frac{A_T G_i}{(x - x_i)^2 + (y - y_i)^2} = P_i \quad (1$$

Here, $P_i$ is the received signal strength at the i-th antenna, $G_i$ is the sensitivity of antenna i, $(x_i, y_i)$ are the coordinates of the i-th antenna, and $A_T$ is the transmitter's radiated power. Therefore, an appliance's location can be obtained by solving an L2-norm minimization problem:

$$\min_{x, y, A_T} \sum_{i=1}^{L} \|f_i(x, y, A_T) - P_i\|_2 \quad (2$$

We first calibrated our system using a known, single-tone transmitter to estimate $G_i$ for the i-th antenna. Then, we used the Nelder-Mead optimization method from the Python scipy package to minimize eq. (2).

Given a received signal $P_i$ at i-th antenna with its respective location $x_i$, $y_i$ and the sensitivity $G_i$, Equation (2) can return both the unknown appliance location (x,y) and its radiated power $A_T$. Although different appliances have different radiated power, our algorithm does not depend on prior knowledge of an appliance's absolute radiated power $A_T$, as the computation is relative. Since we have three unknown parameters (x, y, $A_T$) in Equation (2), at least L≥3 column antennas are needed to produce a location estimate. Intuitively, the more antennas, the more data the algorithm can use for convergence, improving localization accuracy.

Evaluation

For this evaluation, we used the same mobile appliances, rooms, and column antenna deployment as our Appliance Detection study (FIG. 11). For each room, we collected 40 data points (over ~6 seconds) for three mobile appliances at all points on our one-meter grids (which acted as a spatial ground truth). As before, we omitted grid points blocked by furniture. In total, 6,240 data points ((12+14+26 grid locations)×40 data points×3 appliances) were collected for analysis.

Results

Figure 12:
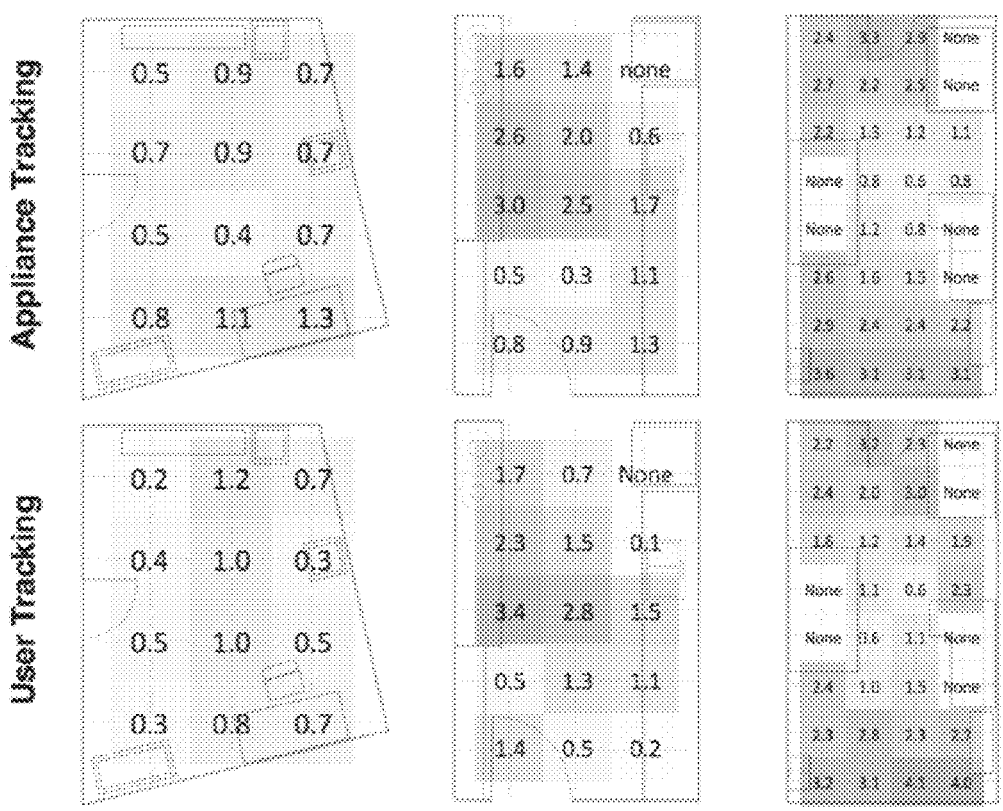
FIG. 12 shows tracking distance error at our three test locations. Left to right: office, kitchen, and workshop.

Our tracking algorithm localized appliances with a mean distance error of 1.4 m (SD=0.5). FIG. 12 (top) illustrates this error across our one-meter room grids. As can be seen, accuracy varies considerably even in a single room (e.g., workshop—FIG. 12, top-right—best tracking accuracy: 0.6 m; worst: 3.6 m), but overall suggests feasibility.

Figure 13:
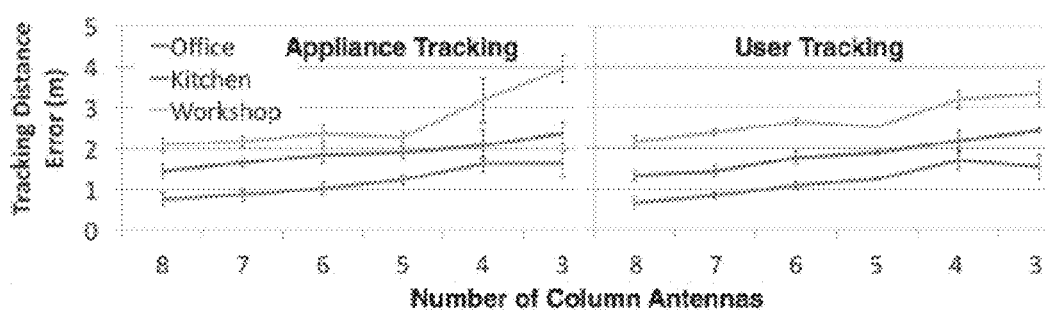
FIG. 13 shows tracking distance error using different numbers of column antennas (three locations tested).

We also considered deployment in real-world locations where doors, windows and other infrastructure might block the placement of the Wall++ system. To simulate this, and investigate how much it affects localization accuracy, we ran a post hoc study removing an increasing number of antennas from the room (FIG. 13). More specifically, for each antenna count, we randomly selected a subset of antennas and reran our localization algorithm using only those data. We repeated this random selection three times for each antenna count and averaged the results.

As expected, tracking error increases as fewer antennas are available. However, even in the worst-case scenario, with only three antennas, we can still localize appliances to within 4 meters on average, which is coarse, but still potentially useful. It also appears likely that using more than 8 antennas would yield even better tracking accuracies. This would be the case in a fully realized installation of the Wall++ system, as our recommended pattern has 8 column antennas every 1.35 m (FIG. 6); a 4×4 m room would have roughly 100 antennas.

User Tracking & Identification

We have already discussed how the Wall++ system can track appliances when they are radiating EM signals. This motivated us to build a small, signal-emitting wristband (FIG. 8D) to enable user localization and identification using the same physical setup and tracking pipeline as appliances.

Our signal-emitting wristband uses a Teensy microcontroller attached to an LC tank, driven by a 3.3 V PWM signal set at a frequency between 800 kHz and 3 MHz. By enabling/disabling the drive pin, the emitted signal can be turned on or off, creating an on/off-keying (OOK) signal that we use to communicate with the Wall++ system (FIGS. 1, I & J) at a maximum speed of 300 baud. Though the throughput is low, it is more than sufficient to transmit a user ID, and even low-speed sensor data, such as heartrate. FIG. 1J shows a waterfall spectrogram from 1.4 to 1.6 MHz with a 1.5 MHz carrier frequency (seen as red line segments).

Evaluation

To evaluate the Wall++ system for user tracking, we conducted an evaluation using a similar procedure to our Appliance Localization study. We configured the wristband to emit a constant 1.5 MHz signal. In each of our three rooms, we asked 5 participants to wear our wristband, and stand on the one-meter grid points sequentially, during which we collected 40 data points (~6 seconds). As before, we omitted grid points that were blocked by furniture.

We also ran a basic study to investigate the data transmission performance over different distances between a participant and a wall antenna. For this test, we used one column antenna sampled at 120 FPS. As a proof-of-concept evaluation, we configured our wristband to output at 20 bits/sec, transmitting a 6-bit header, 8-bit payload length, 16-bit user ID, and 5-bit tail (35 bits in total; FIG. 1J). We recruited 5 participants to wear our wristband, and asked them to stand 1, 2, 3 and 4 meters away from the antenna. At each distance, we recorded 5 data transmissions from the wristband.

Results

Our user tracking results show an average distance error of 1.4 m (SD=0.6). This performance is almost identical to our Appliance Localization results. FIG. 12, bottom, illustrates the tracking error across each room. We also ran a post hoc study to investigate how the number of antennas in a room would affect tracking accuracy (see counterpart study in Appliance Localization for procedure). As before, accuracy decreases with antenna count (FIG. 13), but coarse tracking remains feasible with just three antennas.

With respect to data transmission performance, there were no bit errors for all trials collected within 3 meters of the antenna. However, at 4 meters, the bit error rate increased to 46.4% (SD=26.3). This was due to the carrier signal getting subsumed into background noise. Nonetheless, a 3-meter range would be sufficient for all three of our tested locations (i.e., no point is greater than 3 meters from wall). It is also likely that longer communication range can be achieved by using a higher amplitude emitted signal, or by applying standard error correction techniques.

Example Uses

Touch sensing, pose tracking, and activity detection are well-trodden ground in HCI. Additionally, the Wall++ system can work in concert with many existing feedback mechanisms, including screens (e.g., TVs, smart appliances, wearables), voice interfaces (e.g., Google Home, Amazon Echo) and ambient displays (e.g., smart light bulbs). We offer some illustrative example uses:

Touch Tracking, for example, could enable flexible placement of wall-borne buttons to e.g., turn on/off lights, or provide a number keypad to unlock a door. The Wall++ system's continuous touch tracking could allow slider-like input to adjust e.g., light level, room temperature, or music volume; discrete swipes could be used to change lighting mode, or move between songs.

Pose Tracking could allow users to play video games with their backs near to a wall and control avatars on a TV across the room. Pose tracking could also be useful in inferring human activity and context when users are near to work surfaces, e.g., making dinner vs. coffee on a kitchen countertop. Desks are often pushed up against walls, where the Wall++ system can detect the presence of a user's legs for occupancy tracking. In narrow hallways, we can track users' locomotion (e.g., direction, speed, gait), perhaps even identifying occupants.

Activity Recognition is made possible by the Wall++ system's ability to detect appliance operation, and then track that appliance in a room (and potentially a whole building). This rich source of contextual information can directly inform smart environments and assistive virtual agents. For example, a room can automatically adjust its lighting and window blinds when the Wall++ system detects a TV waking from standby. Users could also subscribe to alerts when certain appliances turn off, such as a laundry machine or electric kettle.

Limitations

Cost. Since walls are pervasive and expansive, the cost of any wall treatment to enable The Wall++ system needs be low in order to be plausible. Our recommended materials and antenna pattern cost $21.30 per $m^2$ for the small number of walls that we augmented for this project. While significantly less expensive than conventional touchscreen technologies, it is still expensive for e.g., a home (which might have 100 $m^2$ of walls). We believe replacing copper tape with conductive paint traces, as well as purchasing materials in bulk, could significantly reduce cost.

Installation Complexity. Although the Wall++ system does not require any special materials or equipment, it still requires a fair amount of wiring effort, as each row and column needs to be connected to a sensor board, presumably hidden in or behind the wall. We also found that applying paint evenly is challenging—our "final" 12×8' wall still showed some fabrication variance, as seen FIG. 9. While within the capabilities of a home DIY enthusiast, it is probably beyond the skill and comfort level of the average consumer.

Interference. Environmental EM noise from e.g., fluorescent lights, can affect the Wall++ system. This is a minor issue in active mutual capacitance sensing, as our excitation signal dominates the received signal. However, in passive EM sensing mode, environmental noise can have a significant impact on SNR. Among our three tested locations, workshop had the noisiest EM environment, which no doubt contributed to it having the lowest accuracies.

Nearby Grounded Objects. We found that well-grounded objects near to a wall, such as a TV, attenuates the shunting effect of a user's body, which in turn interferes with our mutual capacitance sensing. We found a similar effect with airborne EM signals. This finding suggests that real-world installations should avoid using (i.e., skip or disable) antennas that are proximate to such objects. This issue might also be mitigated by using a superior background calibration process and an analog frontend with a programmable gain.

Sensing Range. Our implementation of body pose and airborne EM sensing have limited sensing range (roughly 0.5 and 3 meters respectively). Fortunately, for appliance detection and localization, we found that most appliances in real world settings are close to walls, chiefly because electrical power is provided along the walls (and not in the middle of rooms). While there are some inherent sensing limitations, we do believe that range can be increased with superior circuit topology and software improvements in the future.

CONCLUSION

In this work, we introduced the Wall++ system, a low-cost sensing technique that can turn ordinary walls into smart infrastructure, able to sense interactions and activities happening in a room, and potentially throughout an entire building. Our multi-phase exploration of materials, application methods, and electrode patterns informed our proof-of-concept hardware and software implementation. Then, through a series of user studies, we demonstrated that the Wall++ system can robustly track user touches and poses, as well as detect and track appliances (or tagged users) in a room.

Figure 14:
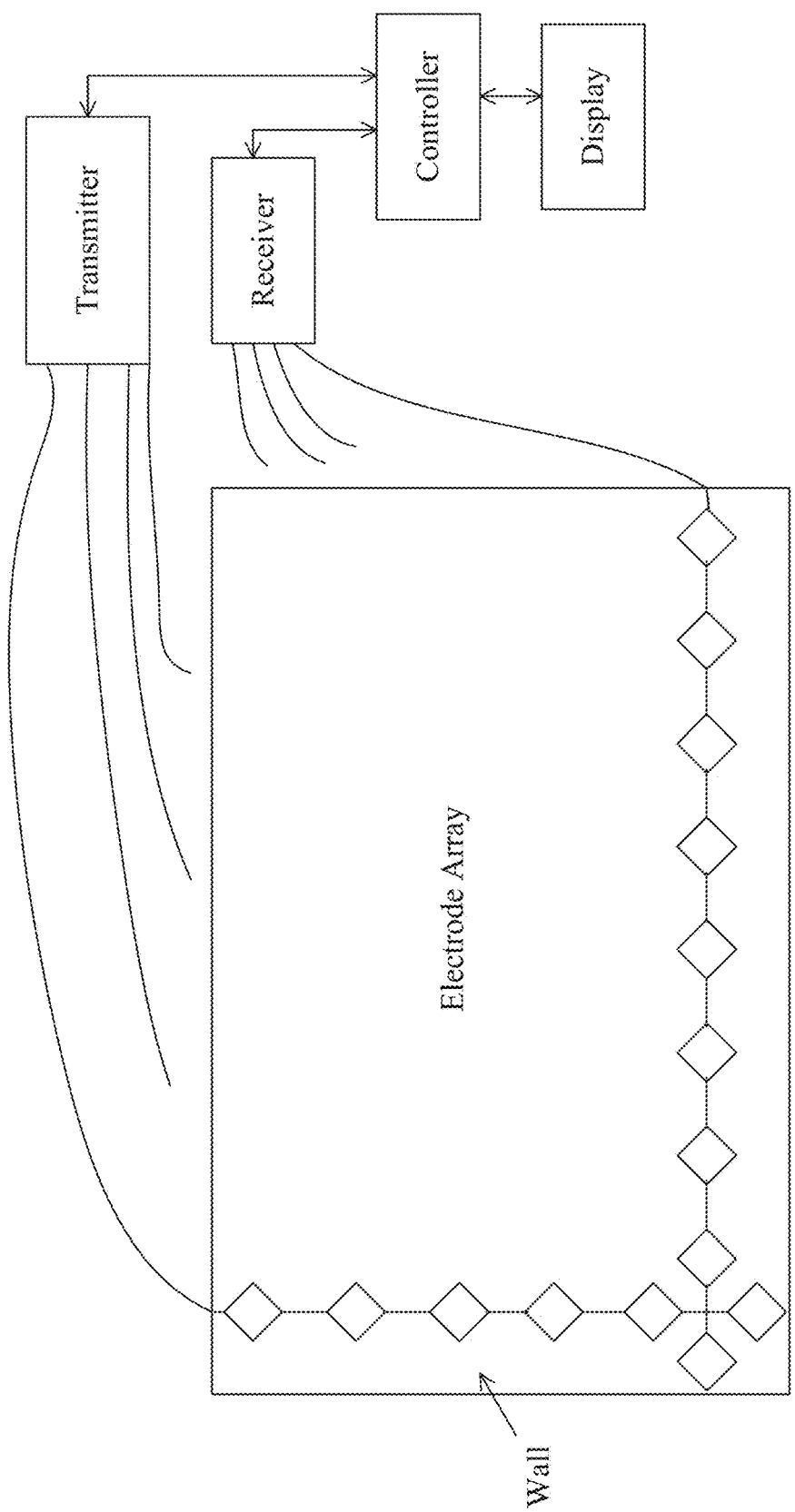
FIG. 14 shows a hardware implementation of the system described herein.

FIG. 14 shows an implementation on a wall where a patterned array of conductive electrodes have been placed or applied in any manner. Only a single column and a single row of such electrodes in the patterned array is shown for illustrative purposes, but it will be understood that there will be a plurality of such columns and rows. It should also be understood that the columns and rows may be oriented at any angle (in other words, the columns need not be vertically oriented and the rows need not be horizontally oriented). A transmitter is attached to each of the columns and a receiver is attached to each of the rows (although this could be reversed). A controller communicates with and controls the operation of the transmitter and receiver. A display may be attached to the controller for displaying the location and type of detected objects. A second wall could be similarly equipped and could be controlled by the same controller.

It should be understood that the frequency of operation of the transmitter and receiver could be in the RF range, or it could be in any other range of electrical or electromagnetic energy. For example, they could operate at 10 kHz or even at DC. In addition, other patterns could be used as an alternative to rows and columns. It may be desirable for such other patterns to have a set that can be attached to a transmitter and a set that can be attached to a receiver. Further, as shown in FIG. 1F, only a subset of the columns (or rows) may be used in certain modes (e.g., passive electromagnetic sensing).

Many methods that utilize the system described herein are possible. Such methods may include sensing a location of a touch or contact or near proximity of a person or animal. It may include sensing a body position and pose of the human or animal. It may also include sensing electromagnetic signals nearby and determining the point on the wall closest to the source of electromagnetic signals as well as determining the type of electronic device that is emitting the electromagnetic signals. It may also include performing similar operations from a different wall, such as an opposed wall or a floor or ceiling. The information from the two walls can be used together to determining positions of humans/animals/electronic devices in three-dimensional space. All of the steps and operations described herein could be performed in any order or any number of times.

It was not obvious to develop the techniques herein for at least several reasons. It is believed that localization of EMI is novel. In addition, the effect of having a wall of separate sensors provides distributed sensors that do a better job of identifying an electronic device than does a single or just a few sensors. A reason that others may have thought such an approach as ours would not work is that they would have thought that background noise would be too much of a problem. Another benefit of effectively having a wall of distributed sensors is that it is thus possible to resolve multiple electronics devices at once.

Further details about passive electromagnetic sensing are provided in U.S. patent application Ser. No. 15/462,457, the entire contents of which are incorporated herein by reference.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A multimode sensing system installed on a wall of a building structure, the system comprising:
    an array of conductive electrodes installed on the wall, the array arranged into rows and columns of conductive electrodes;
    a plurality of conductive traces installed on the wall, each trace interconnecting each of the conductive electrodes in a given row or column;
    a transmitter electrically coupled to one of the rows or the columns of the array of conductive electrodes;
    a receiver electrically coupled to the other of the rows or the columns of the array of conductive electrodes; and
    a processor coupled to the transmitter and the receiver to perform mutual capacitive sensing to determine the position on the array where a change in capacitance is sensed, and coupled to the receiver to perform electromagnetic sensing to sense what types of electronic objects are proximate to the wall and to determine the position on the array where the electronic objects are sensed.

2. A multimode sensing system as defined in claim 1, wherein a room is at least partially defined by at least two such walls with multimode sensing systems defined thereon.

3. A multimode sensing system as defined in claim 1, wherein the array of conductive electrodes is formed on the wall by applying a pattern of electrically-conductive paint thereon.

4. A multimode sensing system as defined in claim 3, wherein the plurality of conductive traces is formed on the wall by applying conductive tape thereon.

5. A multimode sensing system as defined in claim 1, wherein the conductive electrodes are diamond-shaped.

6. A multimode sensing system as defined in claim 1, wherein the mutual capacitive sensing can determine the body pose of a human in close proximity to or in contact with the wall.

7. A multimode sensing system as defined in claim 6, wherein the determining of the body pose includes first sliding a window over the array of the conductors to identify a blob of sufficient total activation, second determining pixels above a threshold in a center one of the columns to identify a torso of the human, third scanning left and right of the blob to identify feet and hands of the human, and fourth using locations of the torso, the feet, and the hands to characterize different body poses.

8. A multimode sensing system as defined in claim 1, wherein the mutual capacitive sensing can determine the body size of a human in close proximity to or in contact with the wall.

9. A multimode sensing system as defined in claim 1, wherein a human in proximity to the wall wears a cooperative electromagnetic transmitter that can be tracked by the system.

10. A multimode sensing system as defined in claim 1, wherein the mutual capacitive sensing can determine a contact point of a human with the wall.

11. A multimode sensing system as defined in claim 1, wherein the transmitter and receiver operate at RF frequencies.

12. A multimode sensing system as defined in claim 1, wherein the sensing of what types of electronic objects are proximate to the wall includes sensing electromagnetic energy from each of the electronic objects and, for each of the electronic objects, comparing a frequency spectrum of the sensed electromagnetic energy to known frequency spectrums of electromagnetic energy from known electronic devices.

13. A multimode sensing system as defined in claim 1, wherein during operation of the multimode sensing system an active signal is injected into the array of conductive electrodes during the mutual capacitive sensing and the active signal is halted during the electromagnetic sensing.

14. A multimode sensing system as defined in claim 13, wherein the active signal, during the mutual capacitive sensing, only one of the columns of the conductive electrodes and only one of the rows of the conductive electrodes are selected at a time and wherein the mutual capacitive sensing includes measuring mutual capacitance between a current pair of the conductive electrodes selected for receiving the active signal.

15. A multimode sensing system as defined in claim 1, wherein the electromagnetic sensing is performed when the electronic objects are powered on and spaced apart a distance from the wall, whereby a layer of air is between the electronic objects and the wall.

16. A sensing system, comprising:
    a wall extending in a vertical plane, the wall being at least one meter wide and at least one meter tall;
    a patterned array of electrodes applied to the wall, the pattern extending at least one meter wide in a horizontal direction and the pattern extending at least one meter tall in a vertical direction; and
    a controller electrically connected to the patterned array of electrodes that utilizes passive electromagnetic sensing to sense electromagnetic energy from a source of electromagnetic energy, determine a location on the wall closest to the source of electromagnetic energy, and determine a type of electronic device that is the source of the electromagnetic energy,
    wherein the determination of the type of electronic device that is the source of electromagnetic energy is made by comparing a frequency spectrum of the sensed electromagnetic energy to known frequency spectrums of electromagnetic energy from known electronic devices.

17. A sensing system as defined in claim 16, wherein the patterned array of electrodes is applied to the wall as paint.

18. A sensing system as defined in claim 17, wherein the paint is electrically-conductive paint.

19. A sensing system as defined in claim 18, wherein the patterned array of electrodes applied by paint is covered on the wall by another layer of paint that is not electrically-conductive.

20. A sensing system as defined in claim 16, wherein the patterned array of electrodes is arranged into a plurality of rows and a plurality of columns.

21. A sensing system as defined in claim 20, wherein each of the electrodes in a given one of the plurality of rows is electrically connected together and each of the electrodes in a given one of the plurality of columns is electrically connected together.

22. A sensing system, comprising:
- a wall extending in a vertical plane, the wall being at least one meter wide and at least one meter tall;
- a patterned array of electrodes applied to the wall, the pattern extending at least one meter wide in a horizontal direction and the pattern extending at least one meter tall in a vertical direction; and
- a controller electrically connected to the patterned array of electrodes that utilizes mutual capacitive sensing to sense contact by a human with the wall and the location on the wall of the human contact and that utilizes passive electromagnetic sensing to sense electromagnetic energy from a source of electromagnetic energy, determine a location on the wall closest to the source of electromagnetic energy, and determine a type of electronic device that is the source of the electromagnetic energy, and
- wherein the determination of the type of electronic device that is the source of electromagnetic energy is made by comparing a frequency spectrum of the sensed electromagnetic energy to known frequency spectrums of electromagnetic energy from known electronic devices.

23. A sensing system as defined in claim 22, wherein the patterned array of electrodes is applied to the wall as paint.

* * * * *